United States Patent [19]
Ellingsen

[11] Patent Number: 5,311,820
[45] Date of Patent: May 17, 1994

[54] METHOD AND APPARATUS FOR PROVIDING AN INSENSITIVE MUNITION

[75] Inventor: Warren Ellingsen, Lewisville, Pa.

[73] Assignee: Thiokol Corporation, Ogden, Utah

[21] Appl. No.: 642,523

[22] Filed: Jan. 17, 1991

[51] Int. Cl.$^5$ .............................................. F42B 15/36
[52] U.S. Cl. ................................. 102/481; 60/39.1;
    60/223; 60/253; 220/89.4; 403/2
[58] Field of Search ..................... 102/377, 378, 481;
    60/39.01, 39.1, 223, 253, 254, 271; 220/89.4;
    403/2

[56] References Cited

U.S. PATENT DOCUMENTS

| | | | |
|---|---|---|---|
| 3,887,991 | 10/1975 | Panella | 60/223 |
| 4,423,683 | 1/1984 | Telmo | 102/481 |
| 4,709,637 | 12/1987 | Boggero | 102/481 |
| 5,036,658 | 8/1991 | Tate | 60/253 |
| 5,044,154 | 9/1991 | English, Jr. et al. | 60/223 |

*Primary Examiner*—Harold J. Tudor
*Attorney, Agent, or Firm*—Ronald L. Lyons; Kendrew H. Colton

[57] ABSTRACT

A heat sensitive case/nozzle interface is provided for an insensitive propellant-loaded munition such that the interface loses its structural integrity when high external heat is applied. The joint between a rocket case housing a rocket motor and nozzle forming the interface is received by an internal spring retainer positioned in a first groove in the case or nozzle in cooperation with a fusible material housed in an aligned second groove in the nozzle or case, respectively. A plurality of aligned openings extend into said first and second grooves. When the rocket is exposed to a high ambient temperature greater than melt temperature of the fusible material but lower than the auto-ignition temperature of the rocket, the fusible material melts and is forced through said holes by the spring retainer permitting the nozzle to separate from the case rendering the rocket motor safe if it auto-ignites.

14 Claims, 4 Drawing Sheets

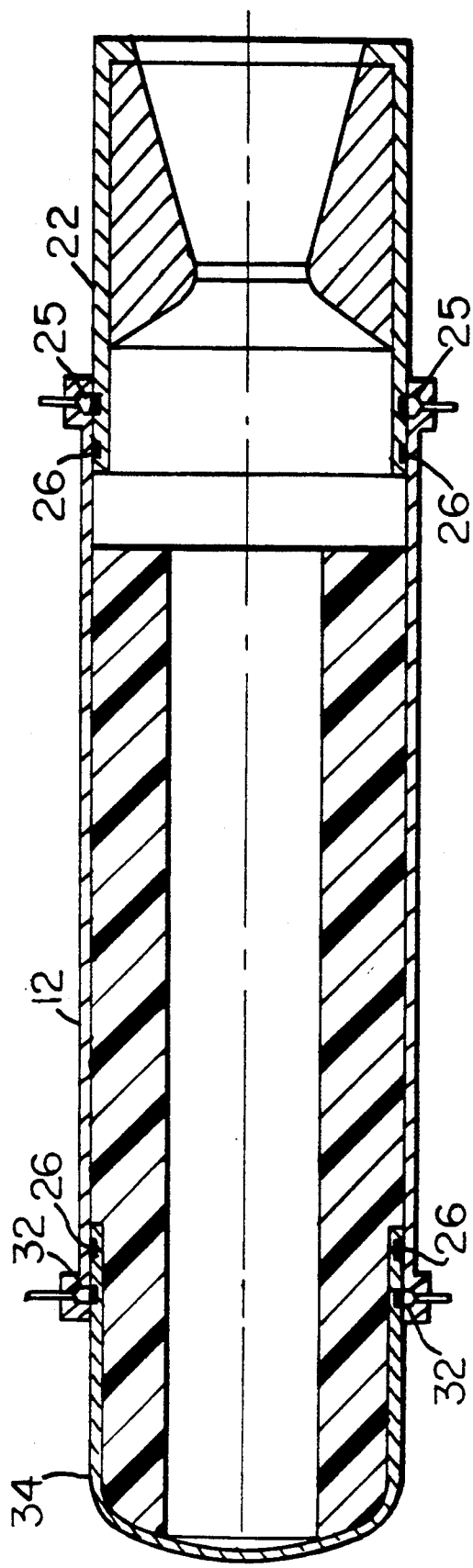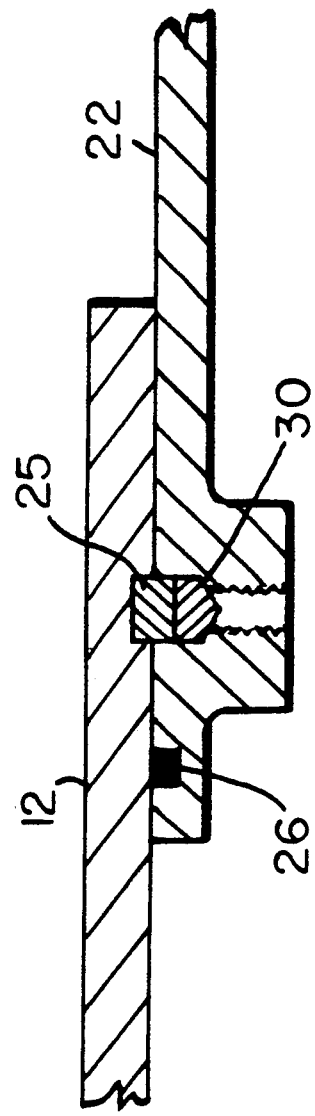

5,311,820

METHOD AND APPARATUS FOR PROVIDING AN INSENSITIVE MUNITION

FIELD OF THE INVENTION

This invention relates to a method and apparatus for providing an insensitive munition, and more particularly to a heat sensitive case/nozzle and case/closure interface of a pressure vessel which separates on the application of high external heat such that the pressure vessel, for example a rocket motor, will fail at a temperature lower than the auto-ignition temperature of the propellant in the rocket motor.

BACKGROUND OF THE INVENTION

The inadvertent ignition or explosion of a munition such as a rocket motor could present a severe hazard. The inadvertent firing or ignition could result when high external heat is applied to the munition, for example, when it is surrounded by fire. The present invention is directed to alleviating this problem by destroying the integrity of the pressure vessel of the munition when external heat is applied. For example, in a rocket motor, the structural integrity of the case to nozzle interface is made to fail at a temperature lower than the auto-ignition temperature of the propellant of the rocket. By separating the nozzle from the rocket case, the throat area of the aft opening of the case without the nozzle is increased significantly resulting in a low operating pressure of the rocket motor even if the propellant were to ignite. The thrust of the motor would be very low, and accordingly would no longer present a hazard.

Accordingly, it is an object of this invention to provide a new and improved method and apparatus for destroying the integrity of the pressure vessel of the munition when external heat is applied prior to reaching the firing temperature or auto-ignition temperature of the propellant of the munition.

A still further object of this invention is to provide a new and improved method and apparatus for providing an insensitive munition which is simple in implementation, inexpensive, and reliable.

SUMMARY OF THE INVENTION

In carrying out this invention, in one illustrative embodiment thereof, an insensitive propellant-loaded munition is provided having a heat sensitive case/nozzle interface which loses structural integrity when heated to a predetermined temperature comprising the steps of interfacing a munitions case and a nozzle with aligned grooves in the case and nozzle; arranging a plurality of holes spaced radially around and in communication with the aligned grooves of the interface; housing an internal spring retainer and a solidified fusible material in the aligned grooves which fusible material melts at a predetermined temperature lower than the auto-ignition temperature of the propellant-loaded munition; and loading the spring retainer in the aligned grooves whereby the loaded spring retainer and solidified fusible material maintain the structural integrity of the case/nozzle interface such that when the predetermined melt temperature of the fusible material is reached the solidified fusible material melts and the spring retainer returns towards its unloaded state and forces the melted fusible material through the radial holes from the grooves thereby separating the nozzle from the case at the interface.

BRIEF DESCRIPTION OF THE DRAWINGS

The invention, together with further objects, aspects, features and advantages thereof will be more clearly understood from the following description taken in connection with the accompanying drawings in which like elements are designated with the same reference numbers throughout the various views.

FIG. 5 is a cross sectional view of another embodiment of the rocket motor of FIG. 1 which includes a forward retainer and forward closure fabricated in the same manner as the nozzle/case interface.

FIG. 6 is an enlarged cross sectional view similar to FIG. 4 showing another embodiment of the case to nozzle interface.

DESCRIPTION OF THE PREFERRED EMBODIMENTS

Figure 1:
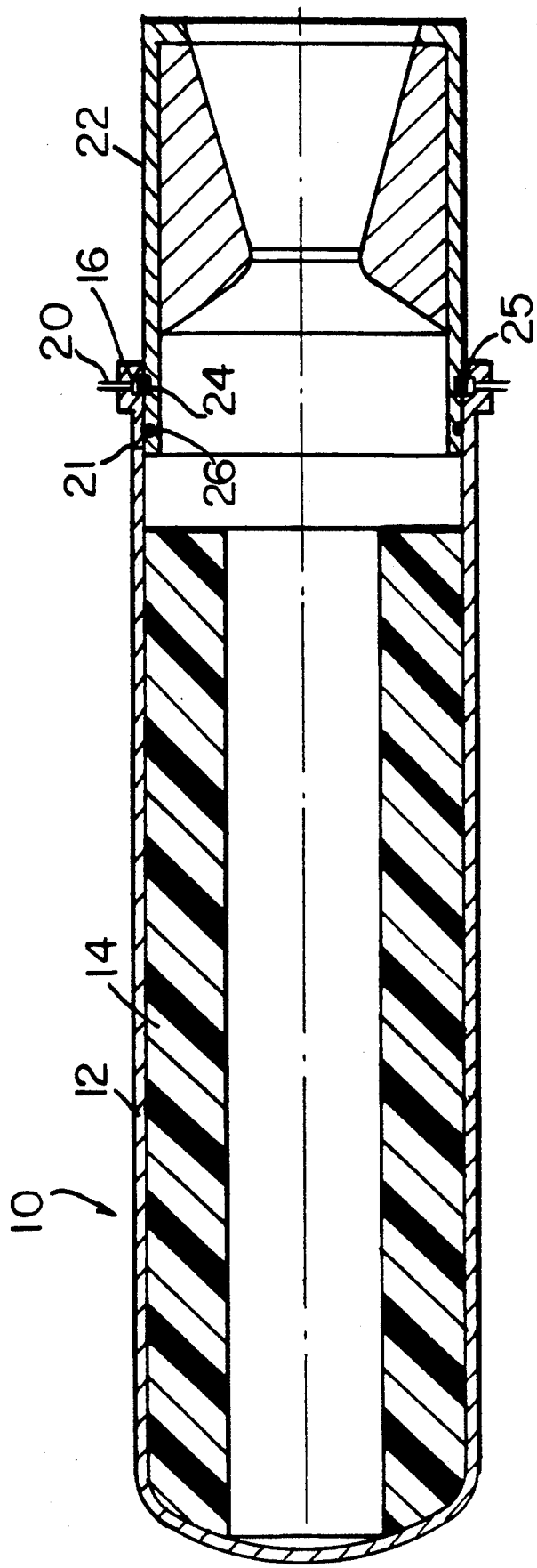
FIG. 1 is a cross sectional view illustrating the case to nozzle interface being retained by an internal retainer.

Referring now to FIG. 1, a pressure vessel or munition, referred to generally with the reference numeral 10, includes a pressure vessel such as a rocket motor case 12 housing a rocket propellant 14 of a suitable polymer matrix which is ignited by conventional means (not shown). A nozzle 22 is retained on or secured to the case 12 by an internal spring retainer 25, such as spring steel, steel alloy, beryllium copper, aluminum alloys, reinforced plastic or any other suitable material that can satisfy the design requirements. A primary objective of the present invention is to provide an insensitive munition 10 by providing a method for destroying the structural integrity of the pressure vessel 10 when external heat is applied, such as when the munition 10 is surrounded by fire. The idea is that the munition 10 should fail at a temperature lower than the auto-ignition temperature of the propellant 14. In the present invention, the munition 10 is designed to lose the structural integrity of the case to nozzle interface 21. If the nozzle 22 separates from the case 12, the throat area of the aft opening of the case 12 without the nozzle 22 will be increased significantly resulting in a very low operating pressure for the munition 10 even if the propellant 14 were to ignite. Accordingly, the thrust of the rocket 10 would be so low as to not present a hazard.

Figure 2:
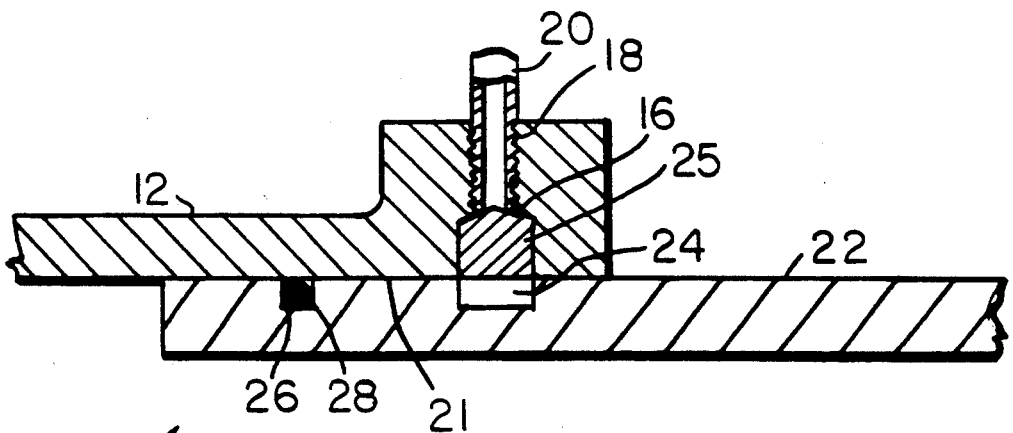
FIG. 2 is an enlarged cross sectional view of the interface area of FIG. 1 showing the retainer in an initial position during the assembly of the nozzle to the case.

The method of eliminating the integrity of the interface 21 between the case 12 and the nozzle 22 will first be described in one embodiment in reference to FIG. 2 in which a retainer 25 preloaded for positioning in case groove 16 is positioned in its original initial position during assembly of the nozzle 22 to the case 12 in case groove 16. Holes 18 drilled in the circumferential periphery of the rocket case 12 and radially aligned with case groove 16 contain set screws 20. The nozzle 22 is provided with a mounting groove 24 which is placed in alignment with case groove 16 of the case 12 when the nozzle 22 is mounted on the case 12. The nozzle 22 also contains an O-ring groove 26 containing an O-ring 28 which will seal the interface area 21 between the rocket case 12 and the nozzle 22. FIG. 2 illustrates the spring retainer 25 in its initial preloaded position in case groove 16 during the assembly of the nozzle 22 to the case 12. The set screws 20 are backed out so that the spring retainer 25 is generally out of contact with the set screws when the retainer 25 is placed in the case groove 16. The retainer 25 is preloaded against the outside diameter of case groove 16 in the case 12 which preloading urges the spring retainer 25 into a larger diameter when in its unrestricted free state then when in its loaded state.

Figure 3:
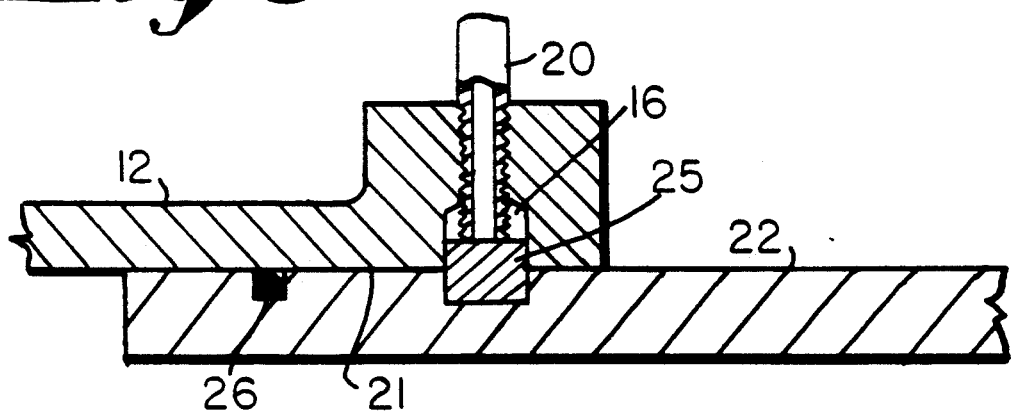
FIG. 3 is an enlarged cross sectional view similar to FIG. 2 illustrating the tightening sequence of the retainer which is shown in a final position for securing the case and nozzle together.

In FIG. 3, the set screws 20 located circumferentially around the case 12 are screwed in gradually in a suitable tightening sequence ultimately placing a part of the retainer 25 in the mounting groove 24 of the nozzle 22 which effectively secures the nozzle 22 to the case 12.

Figure 4:
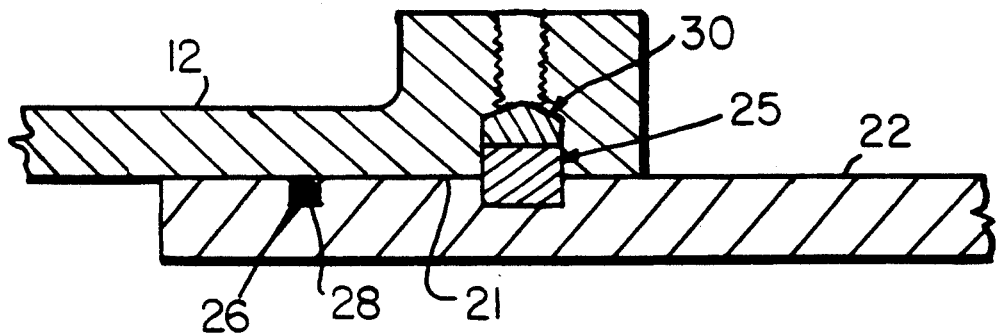
FIG. 4 is a cross sectional view similar to FIG. 3 illustrating the method step in accordance with the present invention of filling the remaining space in a casing groove with fusible alloy when set screws are removed.

Once the retainer 25 is in its final position, as shown in FIG. 3, less set screws 20 are required to hold the retainer 25 in place than compared with the number of set screws required to bring the retainer 25 into place straddling the mounting groove 24 and the case groove 16. Accordingly, some of the set screws are removed and a liquid, low-melt temperature fusible composition, preferably a metal alloy, is then cast into the vacated holes filling the remaining space in the case groove 16 as illustrated in FIG. 4. Other fusible compositions or materials can be used such as plastics, waxes and others. If desired or required, additional small sprue holes may be provided through case 12 circumferentially and radially around the case groove 16 to aid in the casting process.

Metal alloys that would be ideal for this application are fusible alloys, such as for example, those alloys which may be composed of various percentages of one or more of tin, lead, bismuth and cadmium. Such metal alloys would generally be designed to have melt temperatures in the range of about 150° to about 330° F., which melt temperature is primarily dependent upon the composition of the metal alloys. Of course, the melting temperature of the fusible composition or material to be employed will depend on the particular application. As pointed out, the melt temperature of the fusible composition employed should be lower than the firing or auto-ignition temperature of the propellant so the design of the melt temperature will depend on the firing or auto-ignition temperature of the propellant for a particular application. A specific example of a useful low-temperature metal alloy is, for example, an alloy containing about 22% tin, about 50% bismuth and about 28% lead which will melt in the range of about 205° to about 230° F. The invention is not considered limited to this particular example, and the type of fusible material used will depend on the application.

After the fusible material 30 shown in FIG. 4 solidifies, the remaining set screws are removed and the assembly is complete. If desired, the remaining removed set screw holes may also be filled with fusible material. When in the field, if the case 12 were to be exposed to a high ambient temperature, for example a high temperature caused by fire, the solidified fusible material 30 will melt and the preload of the spring retainer 25 will push the melted or liquid fusible material 30 out of the set screw holes 18 or any sprue holes if so provided. The spring retainer 25 will then return toward its original unrestricted free state position as shown in FIG. 2 and consequently, the nozzle 22 will virtually fall off rendering the rocket motor 10 safe.

In rocket motor applications where there is still too much thrust even without the nozzle 22 in place, a similar retainer assembly 32 may be used to hold a forward closure 34 in place on the case 12 as shown in FIG. 5.

The method of eliminating the integrity of an interface between case 12 and forward closure 34 is similar to that described for the case/nozzle interface. A spring retainer assembly 32 comprises a second spring retainer preloaded for positioning in and positioned in a second circumferential mounting groove in the case 12. The forward closure 34 is provided with a groove which is placed in alignment with the second case mounting groove. The forward closure 34 is mounted on case 12 with the preloaded second spring retainer positioned in its original position in the second case mounting groove. Set screws of the retainer assembly 32 are located circumferentially in the case 12 and radially around the second mounting groove. The second spring retainer is preloaded against the outside diameter of the second mounting groove in case 12 which preloading urges the second spring retainer into a larger diameter when in its unrestricted free state.

Set screws located circumferentially around case 12 are screwed in gradually in a suitable tightening sequence ultimately placing a part of the second spring retainer in the forward closing groove which effectively secures the forward closure 34 to the case 12.

Once the second retainer is in its final position less set screws are required to hold the retainer in place than compared with the number of set screw required to bring the retainer into place straddling the second case mounting groove and the forward closure groove. Accordingly, some of the set screws are removed and a liquid, low-melt temperature fusible material is then cast into the vacated holes filling the remaining space in the second case mounting groove. If desired or required, additional small sprue holes may be provided through the case circumferentially around the second mounting groove to aid in the casting process. The fusible material may be the same or different from the fusible material used to secure the nozzle 22 to the case 12.

After the fusible material solidifies, the remaining set screws are removed and the forward closure assembly is complete. If desired, the remaining removed set screws holes may also be filled with fusible material. When in the field, if the case 12 were to be exposed to a high ambient temperature, for example a high temperature caused by fire, the solidified fusible material will melt and the preload of the second spring retainer will push the melted or liquid fusible material out of the set screw holes or any sprue holes if so provided. The second spring retainer will then return toward its original unrestricted free state position in the second case mounting groove and consequently, the forward closure 34 will virtually fall off rendering the rocket motor 10 safe.

With both ends, i.e. the forward closure 34 and nozzle 22, of the motor case 12 removed, the rocket munition 10 will not have a tendency to thrust in either direction thereby rendering the munition insensitive if it is inadvertently ignited from an external heat source.

As will be seen in FIG. 5, the nozzle 22 and/or forward closure 34 slide into the case 12. It will be appreciated that the nozzle and/or forward closure may also fit over either end or both ends of the case 12.

In the embodiment shown in FIG. 6, the spring retainer 25 is positioned in a groove in the case 12 instead of in the nozzle 22 and/or front closure 34 as shown in FIGS. 1-5. The action of the spring retainer 25 is reversed. The spring retainer is preloaded to a larger diameter than when the retainer is in a free state. The meltable or fusible material 30 in solid form occupies the enlarged groove area next to the inside of the spring retainer 25. Accordingly, when heated the spring retainer 25 reduces its diameter and releases the nozzle in the embodiment of FIG. 6.

Although the cross-section of the spring retainer 25 and grooves are shown in substantially rectangular form and ,, substantially rectangular form is preferred, it will be appreciated that either or both the retainer and grooves may vary in shape in any suitable form which operate within the spirit of the invention.

Figure 7:
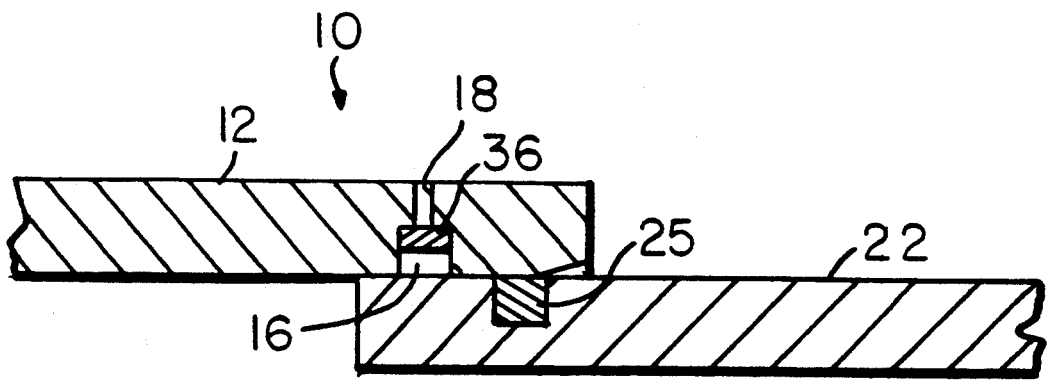
FIG. 7 is an enlarged cross sectional view of another embodiment showing the interface area during assembly.
Figure 8:
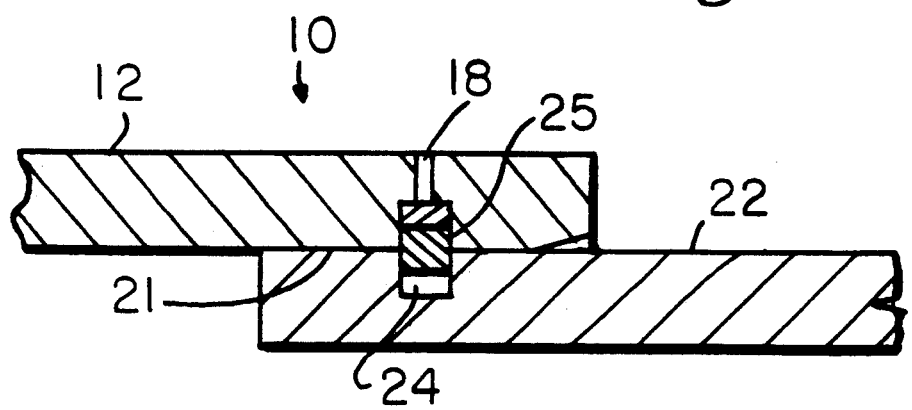
FIG. 8 is similar to FIG. 7 showing the interface in operative position.
Figure 9:
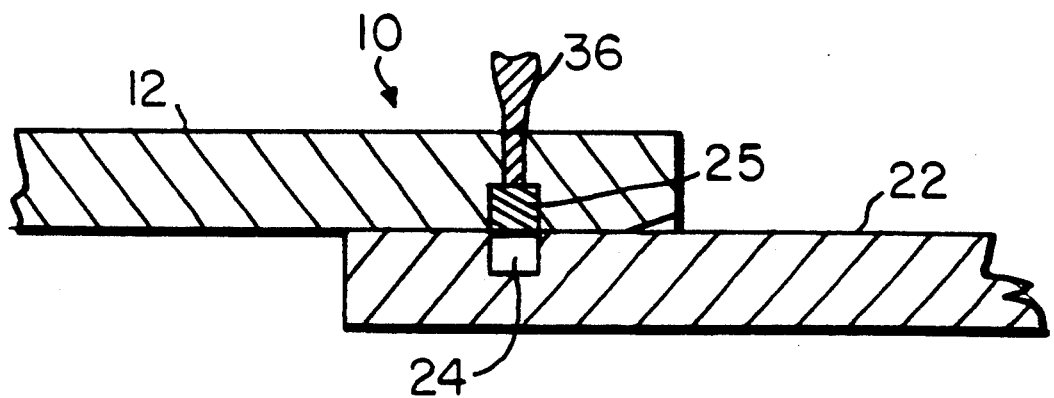
FIG. 9 illustrates the case/nozzle interface after being exposed to a predetermined temperature.

In another embodiment as illustrated in FIGS. 7-9 instead of casting a fusible material into the case or nozzle grooves, a strip of fusible material 36 is placed in the case groove 16 as shown in FIG. 7 prior to assembly of the munition. The spring retainer 25 is placed in and fills groove 24 in the nozzle 22.

When assembled as shown in FIG. 8, the spring retainer 25 springs out against the strip of fusible material 36 in the case groove 16. If the assembled interface 21 is exposed to a temperature which exceeds the predetermined melt temperature of the strip of fusible material 36, the strip 36 melts and the spring retainer 25 expands until filling the groove 16 in the case 12 while forcing the liquid fusible material 36 out of the radial holes 18 as shown in FIG. 9.

Accordingly, a very effective method for eliminating the integrity of the joint between a case and nozzle of a munition is described reducing the hazards involved from external causes, such as for example, from ambient heat when the munition is surrounded by fire. A reliable, easy to fabricate method and apparatus are provided which separate munition components to prevent uncontrolled thrust if it auto-ignites and, when necessary, such separation may occur both fore and aft of the munition case.

Since various other changes and modifications to fit the particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. A munition that loses integrity and separates into component parts when the ambient temperature of an interface mounting means of said munitions exceeds a predetermined temperature comprising:

a case having a groove therein;

said groove having a plurality of holes spaced radially around and in communication with said groove;

a nozzle having a groove therein, said grooves in said case and nozzle being in alignment and forming an interface between the case and nozzle when said case and nozzle are positioned together;

a spring retainer positioned in said grooves;

a fusible material adjacent said radial holes, and positioned in said case groove holding said spring retainer in said aligned grooves in a loaded position thereby securing said case and nozzle together and which upon exposure of said munition to an ambient temperature higher than the melting point of said fusible material, the fusible material melts to thereby flow through said radial holes in communication with said case causing separation of said nozzle from said case.

2. The munition as claimed in claim 1 wherein said fusible material is a composition comprised of one or more metals selected from the group consisting of tin, lead, bismuth and cadmium.

3. The munition as claimed in claim 1 wherein said fusible material has a melting point in the range of about 150° to about 330° F.

4. The munition as claimed in claim 1 having a forward closure, said forward closure mounted on said case and having a circumferential forward closure groove therein;

said case having a circumferential second case groove therein, said circumferential second case groove being in alignment with said forward closure groove;

said circumferential second case groove having a plurality of second holes spaced radially around and in communication with said circumferential second case groove;

a second spring retainer positioned in said forward closure groove and said circumferential second case groove;

a second fusible material adjacent said second radial holes, and positioned in said circumferential second case groove holding said second spring retainer in said aligned grooves in a loaded position for securing said forward closure and case together and which upon the exposure of said munition to an ambient temperature higher than the melting point of said second fusible material, the second fusible material melts to thereby flow through said second radial holes in communication with said circumferential second case groove causing separation of said forward closure from said case.

5. A munition that loses integrity and separates into component parts when the ambient temperature of an interface mounting means of said munition exceeds a predetermined temperature comprising:

a case having a circumferential case groove therein;

a nozzle mounted on said case and having a nozzle mounting groove therein, said mounting groove being in alignment with said circumferential case groove;

a spring retainer preloaded for positioning in said circumferential case groove;

a plurality of holes located circumferentially around said case in radial alignment and in communication with said circumferential case grove so as to accept removable, adjustable mounting means for positioning and holding said spring retainer in both of the aligned grooves in a loaded position thereby joining said case and said nozzle;

a low-melt temperature fusible material adjacent said holes and positioned in and solidified in said circumferential case groove, said solidified fusible material holding said spring retainer in its loaded position in both of said aligned grooves thereby securing said case and nozzle together and which on exposure of said munition to ambient temperature higher than the melting point of said fusible material, the fusible material melts to thereby flow through said radial holes in communication with said circumferential case groove causing separation of said nozzle from said case.

6. The munition as claimed in claim 5 wherein said fusible material is a metal alloy comprised of one or more metals selected from the group consisting of tin, lead, bismuth and cadmium.

7. The munition as claimed in claim 5 wherein said fusible metal alloy has a melting point in the range of about 150° to about 330° F.

8. The munition as claimed in claim 5 having a forward closure,
said forward closure mounted on said case and having a circumferential forward closure mounting groove therein;
said case having a second circumferential case groove therein, said second circumferential case groove being in alignment with said forward closure mounting groove;
a second spring retainer preloaded for positioning in said second circumferential case groove;
a plurality of second holes located circumferentially around said second circumferential case grove in radial alignment and in communication with said second circumferential case groove so as to accept removable, adjustable mounting means for positioning and holding said second spring retainer in a loaded position in both of the second aligned grooves thereby joining said case and said forward closure;
a second low-melt temperature fusible material adjacent said second holes, and positioned in and solidified in said second circumferential case groove, said solidified second fusible metal alloy holding said second spring retainer in its loaded position in both of said aligned second circumferential case groove and forward closure mounting groove securing said forward closure and case together and which on the exposure of said munition to ambient temperature higher than the melting point of said second fusible material, the second fusible material melts to thereby flow through said second radial holes in communication with said second circumferential case groove causing separation of said forward closure from said case.

9. In a munition containing a propellant and having a munition case/nozzle interface the improvement comprising the case/nozzle interface adapted to lose structural integrity in the presence of a predetermined ambient temperature by the case/nozzle interface having a preloaded internal spring retainer positioned in and held in circumferential radially aligned grooves in the case and nozzle in a loaded position by a solidified low-melt temperature fusible composition, which low-melt temperature fusible composition has a melt temperature lower than the auto-ignition temperature of the propellant in the munition said fusible composition positioned in one of said grooves and said one of said grooves groove having a plurality of holes spaced radially around and in communication with said one of said groves to permit flow of said fusible composition through said holes upon melting, said fusible composition being adjacent said holes.

10. The munition as claimed in claim 9 wherein the low-melt temperature fusible composition is a fusible metal alloy comprised of one or more metals selected from the group consisting of tin, lead, bismuth and cadmium.

11. The munition as claimed in claim 10 wherein said fusible metal alloy has a melting point in the range of about 150° to about 330° F.

12. The munition of claim 9 having a forward closure/case interface adapted to lose structural integrity in the presence of a predetermined ambient temperature by the forward closure/case interface having a second preloaded retainer positioned in and held in a loaded condition in circumferential radially aligned grooves in the forward closure and case by a second solidified low melt temperature fusible composition, which low-melt temperature second fusible composition has a melt temperature lower than the auto-ignition temperature of the propellant in the munition said second fusible composition positioned in one of said grooves in said forward closure and case and said one of said grooves in said forward closure and case having a plurality of second holes spread radially around and in communication with said one of said grooves in said forward closure and case to permit flow of said second fusible composition through said second holes upon melting said second fusible composition being adjacent said second holes.

13. The munition as claimed in claim 12 wherein the low-melt temperature fusible composition is a fusible metal alloy comprised of one or more metals selected from the group consisting of tin, lead, bismuth and cadmium.

14. The munition as claimed in claim 13 wherein said fusible metal alloy has a melting point in the range of about 150° to about 330° F.

* * * * *